US012784720B2

(12) United States Patent
Rein et al.

(10) Patent No.: US 12,784,720 B2
(45) Date of Patent: Nov. 3, 2026

(54) METHOD AND SYSTEM FOR AI-BASED SONG REMIXING

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: BELLEVUE Investments GmbH & Co. KGaA (DE)

( * ) Notice: Subject to any disclaimer, the term of this patent is extended or adjusted under 35 U.S.C. 154(b) by 318 days.

(21) Appl. No.: 18/794,035

(22) Filed: Aug. 5, 2024

(65) Prior Publication Data

US 2025/0046280 A1 Feb. 6, 2025

Related U.S. Application Data

(60) Provisional application No. 63/530,856, filed on Aug. 4, 2023.

(51) Int. Cl.
*G10H 1/00* (2006.01)

(52) U.S. Cl.
CPC ..... *G10H 1/0025* (2013.01); *G10H 2210/131* (2013.01)

(58) Field of Classification Search
CPC ....................... G10H 1/0025; G10H 2210/131
See application file for complete search history.

(56) References Cited

U.S. PATENT DOCUMENTS 11,158,295 B2 10/2021 Rein et al.
11,232,773 B2 1/2022 Rein et al.
11,615,138 B2 3/2023 Rein et al.
11,741,922 B2 8/2023 Rein et al.
11,972,746 B2 4/2024 Rein et al.
12,009,013 B2 6/2024 Rein et al.
2024/0241905 A1 7/2024 Rein et al.
2024/0242737 A1 7/2024 Rein et al.
2024/0379081 A1 11/2024 Rein et al.
2024/0420669 A1 12/2024 Rein et al.
2025/0014547 A1 1/2025 Rein et al.
(Continued)

OTHER PUBLICATIONS

Huang, Jiawen, Wang, Ju-Chiang & Smith, Jordan & Song, Xuchen & Wang, Yuxuan. (2021). Modeling the Compatibility of Stem Tracks to Generate Music Mashups. Proceedings of the AAAI Conference on Artificial Intelligence. 35. 187-195. 10.1609/aaai.v35i1.16092.

(Continued)

*Primary Examiner* — Philip F Gabler
(74) *Attorney, Agent, or Firm* — Fellers, Snider, Blankenship, Bailey & Tippens, P.C.; Terry L. Watt

(57) ABSTRACT

According to an embodiment, a trained AI is provided that automatically identifies stems of a music work and loops within the stems. Information about the stems, the cut points of loops, and the loop's fundamental parameters will be formed into an AI Song pack. The remixing step uses the AI Song pack as a starting point and a database of loops is searched to identify audio loops that can replace loops with similar sonic characteristics in the music work to create a remix. Once some number of candidate loops have been identified a final remixed audio track will be produced which is comprised of replaced loops from the database. Alternatively, replacement stems might be created by replacing all loops in each stem. Finally, effects might be applied to the audio material created by either approach.

16 Claims, 3 Drawing Sheets

(56) References Cited

U.S. PATENT DOCUMENTS

| | | | |
|---|---|---|---|
| 2025/0046280 | A1 | 2/2025 | Rein et al. |
| 2025/0047955 | A1 | 2/2025 | Rein et al. |

OTHER PUBLICATIONS

Hernandez Oliván, Carlos & Hernandez-Olivan, Javier & Beltrán Blázquez, José Ramón. (2022). A Survey on Artificial Intelligence for Music Generation: Agents, Domains and Perspectives. 10.48550/arXiv.2210.13944.
Dash, et al.,2022, AI-Based Affective Music Generation Systems: A Review of Methods and Challenges, ACM, pp. 1-26, United States.
Wang, Ju-Chiang, et al., Mel-Bank Roformer for Music Source Separation, Extended Abstracts for Late-Breaking Demo Session of the 24th Int. Society for Music Information Retrieval Conf., Milan, Italy (2023).
Roads, Artificial Intelligence and Music, 1980, pp. 13-25, The MIT Press, vol. 4, No. 2.
Marcos, An investigation on the automatic generation of music and its application into video games, School of Computing and Communications, 2019, United Kingdom.
Chakraborty, Tanujit & K S, Ujjwal Reddy & Naik, Shraddha & Panja, Madhurima & Manvitha, Bayapureddy. (2024). Ten Years of Generative Adversarial Nets (GANs): A survey of the state-of-the-art. Machine Learning: Science and Technology. pp. 1-29, U.A.E.
Zhu, Yueyue & Baca, Jared & Rekabdar, Banafsheh & Rawassizadeh, Reza. (2023). A Survey of AI Music Generation Tools and Models. 10.48550/arXiv.2308.12982, United States.
Cano, et al., Musical Source Separation: An Introduction, IEEE Signal Processing Magazine, 2019, 36(1), pp. 31-40.
Defossez, Alexandre & Usunier, Nicolas & Bottou, Leon & Bach, Francis. (2019). Music Source Separation in the Waveform Domain. 10.48550/arXiv.1911.13254.
Brunotts, Kate, Stem Splitting Tools: How They Work and Which One to Use; Oct. 21, 2021, Internet Article.
Google Search, Automatic ai remixing, downloaded Jul. 22, 2024.
Google Search, Automatic ai remix, downloaded Jul. 22, 2024.

METHOD AND SYSTEM FOR AI-BASED SONG REMIXING

CROSS-REFERENCE TO RELATED APPLICATIONS

This application claims the benefit of pending U.S. Provisional Patent Application Ser. No. 63/530,856, filed Aug. 4, 2023, and incorporates said provisional application by reference into this document as if fully set out at this point.

TECHNICAL FIELD

This disclosure relates generally to methods of generating audio content and, in more particular, to methods utilizing machine learning in an artificial intelligence-based ("AI") selection engine for automatic audio content analysis, extraction and song pack generation from existing audio material for further remixing of the audio material utilizing the results from the content analysis and extraction, additionally utilizing and benefitting from an audio loop database generated and administered by an AI machine learning system.

BACKGROUND

Creation of a musical work has been a goal and dream of many people for as long as music has been around. However, a lack of knowledge of details regarding the intricacies of musical styles has prevented many from writing or generating music. As such, this endeavor has, for a very long time, been the purview of individuals having the necessary knowledge and education.

With the advent of the personal computer and other computerized devices (e.g., tablet computers) and the widespread adoption of these devices in the home consumer market, software products emerged that allowed a user to create original music without the need to know music theory or needing to understand the terminology of music constructs such as measures, bars, harmonies, time signatures, key signatures, etc. These software products feature graphical user interfaces that provide users with a visual approach to song and music content creation that allowed the novice user easy access to the tools useful in music generation and enabled the users to focus on the creative process without being hampered by having to learn the intricacies of music generation.

In addition to increasing the accessibility of music generation, the content that is available and usable in the process of generating music has also been adapted to correspond to the directive of supplying an easy-to-use music generation approach. These sorts of programs typically provide a number of individual sound clips of compatible length, e.g., audio samples, sound loops or just "loops", which can be selected and inserted into the multiple tracks of an on-screen graphical user interface as part of the process of music creation. With these sorts of software products, the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of the graphical user interface of a mobile or desktop-based software product according to their own taste and are therefore potentially able to generate individual verses and maybe the refrain of their own song.

To analyze an existing song and generate individual song sections and extract and utilize specific pieces from that existing song for processing of that particular existing song to generate alternates and variants of that existing song is however not something that the casual user is able to do and additionally something that is, in its functionality, not provided to the user from an existing software program.

Thus, what is needed is a system and method that allows the user to work with an existing song, to automatically generate excerpts and pieces from that existing song and additionally to generate alternates and variants of that existing song with the utilization of an AI based system.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for AI-assisted audio content analysis, extraction, and generation of song content packs from a user-provided audio source. As a preliminary matter a manual process is undertaken by a human music producer to build a database that contains stems and audio loops that have been extracted by the producer from an audio work. The stems and loops, along with the audio work, are stored together in an audio database. Alternatively, software might be used that automatically extracts stems and loops from an existing audio work and then adds them to the database along with the audio work they were obtained from. In either case, each loop in the database is analyzed to obtain, say, around 200 fundamental or low-level parameters from each loop which characterize it. The parameters might include, for example, volume, loudness, FFT or spectral frequencies, etc. In one preferred embodiment, a further computation (e.g., a principal component analysis ("PCA"), a linear discriminant analysis ("LDA"), etc.) is applied to the fundamental parameters to reduce their number and dimensionality. The parameter values associated with the reduced dimensionality calculation will typically be stored in the database along with each audio work its stems, loops, and, optionally, its fundamental parameters. An AI system is then trained using the database to enable it to identify stems and the loops extracted from the stems based on the associated audio work. In some embodiments this might be done using a convolutional neural network.

According to an embodiment, the instant invention utilizes the trained AI as follows. As an initial step, a user selects an audio work that is to be remixed and uploads it to the instant system. The AI automatically identifies stems of the work, preferably with one instrument or one type of instrument per stem. Each of the stems is then separated into some number of individual loops. For example, one stem might give rise to 10 audio loops. Information about the stems, the cut points of loops, and the fundamental parameters and/or a reduced dimensionality version of same, will preferably be used to create an AI Song pack for the audio work. This song pack contains sufficient information to be able to re-create the original song if it is necessary to do so.

The remixing step proceeds using the AI Song pack as a starting point and the original audio loops are automatically utilized in multiple different ways to create a remix. For example, the loops in the original song might be rearranged and/or mixed/exchanged with audio loops selected from the database, where the candidate loops in the database might be selected by using the fundamental parameters to determine the multivariate distance of a loop from the original song with loops in the database.

Once some number of candidate loops have been identified, a couple of approaches are preferred. In a first approach, a final remixed audio track will be produced which is comprised of some number of rearranged and/or replaced original loops with loops from the database. In a second approach, i.e., the "audio stem approach", replacement stems might be provided which have been created by replacing all loops on each stem.

Finally, and in some embodiments, effects (i.e., "FX") might be applied to the audio material created by either approach. The sorts of FX that might be applied to the individual stems might include, for example, reverb to stem 1, distortion to stem 2, etc. Obviously, FX could also be applied to the generated version of the user's original song after the new stems are recombined The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
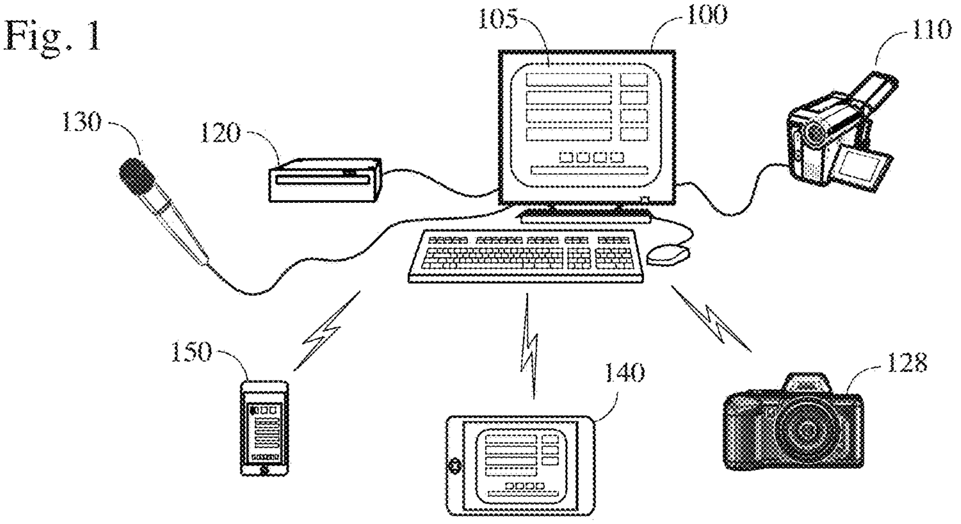
FIG. 1 is an illustration of a working environment of the instant invention according to an embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software running on a user's computer 100 or another device with a CPU such a table computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external video 110 or digital still (or video) camera 128 of some sort be utilized with-and will preferably be connectible to the computer so that video and/or graphic information can be transferred to and from the computer 100 (FIG. 1). Preferably the camera 110/128 will be a digital video camera, although that is not a requirement, as it is contemplated that the user might wish to utilize still images from a digital still camera in the creation of his or her multimedia work. Further given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a multimedia work and an external storage device 120 such as a CD or DVD burner, an external hard disk, an SSD drive, etc., could prove to be useful for storing in-progress or completed works. Further, it might also be possible, and is shown in FIG. 1, that the process of the instant invention might be implemented on portable tablet computer devices 140 or on mobile devices, such as smart phones 150.

Figure 5:
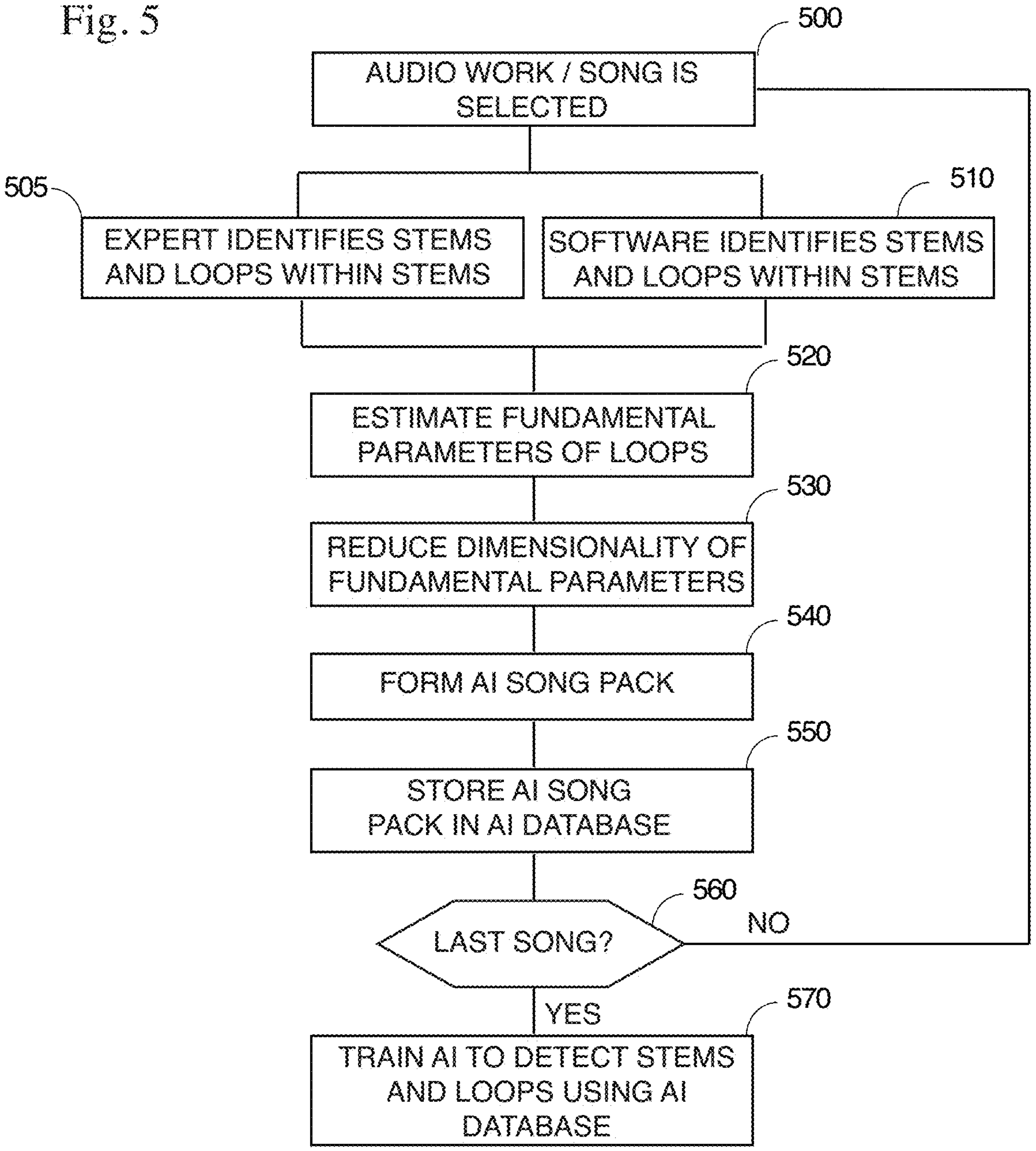
FIG. 5 illustrates the general steps of processing the input original audio material according to the instant invention.

As an initial step and as illustrated in FIG. 5, a curated database is constructed from songs 500 that have been selected and analyzed to identify their stems and the loops that are located in each stem. The analysis might be a manual process that is undertaken by a human music producer 505 or alternatively, an algorithm might be used that identifies 510 the stems and loops of the selected audio work or song. In either approach, the stems and the loops within each are subject to an analysis 520 to obtain certain fundamental parameters.

By way of explanation, in audio production a stem is a discrete or grouped collection of audio sources which have been mixed together with the intention that they be manipulated as a group downstream. Stem is an acronym, for "Stereo Masters." Stems can be thought of as often representing subgroups of tracks. For example, a stem might contain a stereo (or mono) recording of all of the drums in a drum kit or a recording of all of the guitars or all of the keyboards in a song. By way of comparison, the tracks of a multitrack recording typically have every instrument recorded in a separate track, e.g., with each of the drums in the kit recorded in separate channels. Those sorts of recordings are typically not considered stems. A single stem might be mono, stereo, or in multiple tracks for surround sound. A multitrack recording session might contain from 20 to a couple of hundred tracks, stem recording sessions usually will contain only 4 to 20 tracks.

The identified audio loops that are stored in the database are additionally contextualized/analyzed 520 to obtain, say, around 200 low level fundamental parameters from each loop. The parameters that are obtained will tend to represent in numerical form the essential characteristics of each loop. The low level fundamental parameters that might be calculated could include volume, loudness, frequency content (FFT or spectral frequencies), etc. Additionally, parameters such as the genre(s) associated with the song, its tempo, key, length, etc., might also be determined, i.e., the song's metadata tags will be determined.

In one preferred embodiment, a further computation 530 might be applied to the low level fundamental parameters to reduce their dimensionality. For example, a principal component analyses (i.e., "PCA") and linear discriminant analyses ("LDA") are often applied to multidimensional datasets to reduce dimensionality. Methods of reducing the dimensionality of multivariate data sets are well known to those of ordinary skill in the art and PCA and LDA are just two examples of same.

The resulting reduced dimensionality parameter set which, in some embodiments might comprise at least eight or so parameters, will be used going forward. For example, one of the reduced dimensionality parameters might represent in a general way the instrument(s) that are predominant in each loop. Of course, those of ordinary skill in the art will recognize that fewer or greater parameters than eight might be used depending on the situation. As a general matter, typically between about 5 and 15 reduced dimensionality parameter values would be sufficient to characterize the associated loops to an acceptable level of explained variance. Note that, for purposes of the instant disclosure, the song's metadata tags together with said low level fundamental parameters or said reduced dimensionality parameter set will be referred to collectively as the fundamental parameters hereinafter.

Continuing with the present example, using a reduced dimensionality parameter set comprised of 8 parameters the instant invention can generate a mapping in 8-dimensional space of each audio loop, with musically similar loops being positioned in the vicinity of each other in 8D space. The metadata tags together with the reduced dimensionality parameter set as well as the low level fundamental parameters, might be stored together in the database and for use by the machine learning AI, first as part of the training process, and then, later, in remixing the loops and stems of the song provided by the user.

The song, stems, loop cut points, and at least the reduced dimensionality parameter set will be stored in the database in the form of an AI Song Pack 540 which might take the form of the data structure in FIG. 3, which is discussed below. Note that the loop cut points are generally intended to be stored as part of the AI Song Pack but, in certain cases, it might be more efficient to extract the loops and store them as discrete items in the AI Song Pack. Thus, for purposes of the instant disclosure, when it is said that a loop is "stored" either in the AI Song Pack or in a database, that word should be understood to include instances where only the location in the stem of the loop, i.e., its cut points, is stored and instances where the loop is extracted and stored separately along with the stem from which it was obtained.

After a sufficient number of songs have been added to the AI Database 550 (the "NO" branch of decision item 560), the AI Database is then used to train an AI system 570 to intake a new song and identify and/or extract stems and loops within the stems. In some embodiments, the AI will be a convolutional neural network. Of course, it is anticipated that as new songs are added to the database the AI may need to be periodically updated or retrained.

Figure 3:
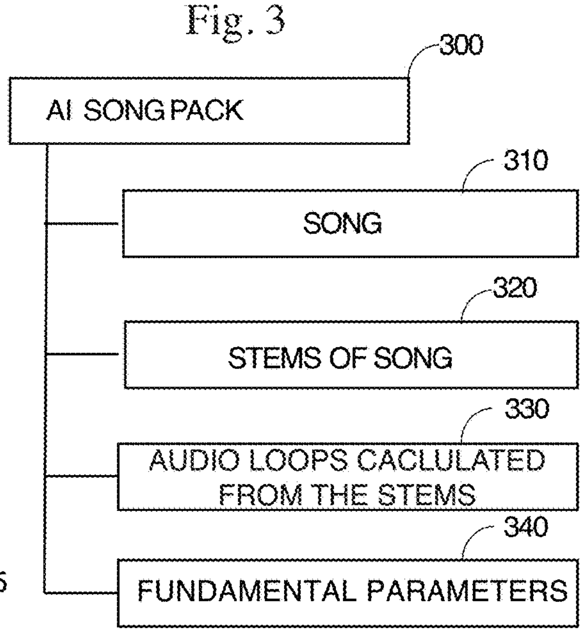
FIG. 3 depicts the structural setup of the AI Song Pack of the instant invention.

As is indicated in FIG. 3, one preferred arrangement of an AI Song Pack 300 contains the original song 310 provided by the user, together with the stems calculated from or identified in that song 320. Preferably each stem will focus on a single instrument type and be the same length as the original song. For example, if a song is two minutes in length, then one generated stem that is focused on the piano instrument will also preferably be two minutes in length and only contain the piano melodic components.

Additionally, audio loops that have been identified within the stems 330 will also be noted. The audio loops that have been identified from each stem will be a subset of it and will preferably consist of three to eight seconds of audio. In some cases the loops might be extracted from the stems and stored separately. In other arrangements, the starting and ending times of each loop will be stored along with the stem the loop was located in so that the loops can be extracted at a later time. Finally, the AI Song Pack will also include characterizing parameters associated with the loops and metadata tags 340 that have been generated by the AI analysis of the original song. In some cases the entire suite of calculated low level fundamental parameters (e.g., 200+ parameter values) might be stored in the song pack along with the metadata. In other cases, the reduced dimensionality version of same 340 might be stored instead of, or in addition to, the full fundamental data set. Obviously, for purposes of computational economy and reduced storage requirements, the reduced dimensionality version would generally be preferred.

Figure 2:
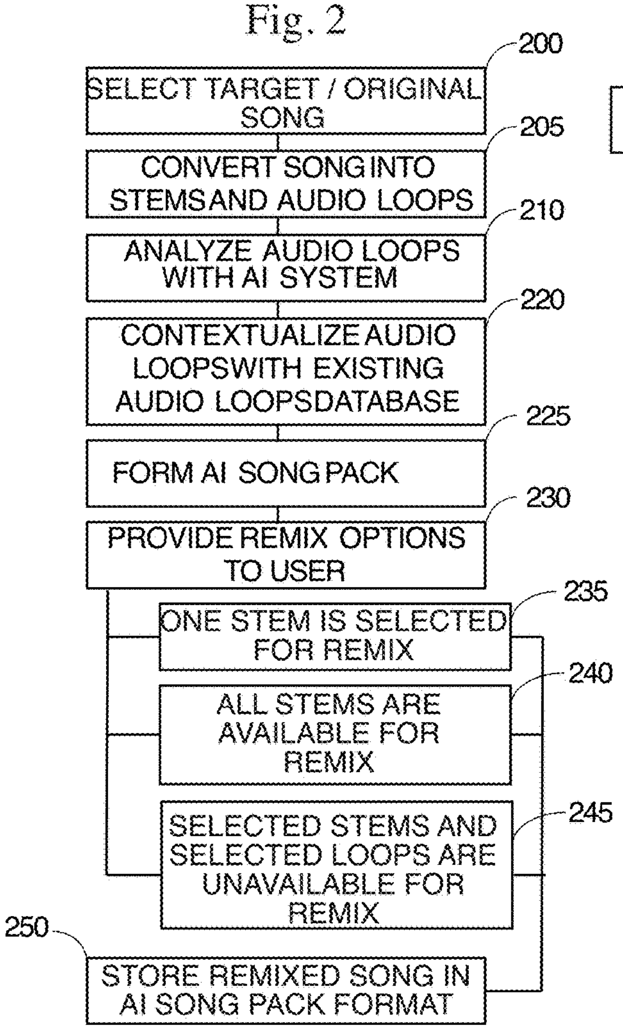
FIG. 2 depicts the workflow displaying the functionality of the instant invention.

Turning next to FIG. 2, this figure depicts a possible work flow associated with one embodiment. This embodiment begins with the selection of an original song by a user 200. This song will be one which the user would like to generate a remix or a variation of with one goal being producing output audio material that is primarily based on new loops that have characteristics similar to those of the original song.

The user's audio work will be analyzed by the trained AI system to identify and/or extract audio stems and loops from it 205. The identified stems and loops will preferably then be organized into an AI Song Pack format 300 of the form discussed previously. The AI Song Pack format contains the information that will be used by the AI music system to generate variants and alternate versions.

In a next preferred step and as part of the intake process, the generated audio loops are analyzed by the trained AI system 210 and their fundamental parameters calculated and made commensurate with the existing audio loops 220.

As a next preferred step and as discussed previously, an embodiment of the instant invention will then form an AI Song Pack 255 using the stems, loops, and fundamental parameters calculated previously together with a copy of the original song.

Next, the remix function 230 is initiated. As indicated in FIG. 2, preferably at least three options will be available to the user although certainly other options might be presented depending on the end goals of the designer or other individual of ordinary skill in the art. The AI Song Pack is accessed by the remix front-end software application to implement the user's selection(s) and generate alternative versions of the user's original song by manipulating the loops that have been identified and are stored as part of the AI Song Pack.

In one potential remix variant 235, the user will be asked to choose one of the song stems and then some or all of the loops in that stem will be replaced with loops from a loop database. The loop database might be the AI database discussed previously or it might be a separate database. Whichever approach is used, i.e., whether the AI Database is accessed or a separate loop database, it is understood that the loops in the loop database will have fundamental parameters and metadata associated therewith in the same fashion as those that are stored in the AI Database. Thus, when the instant disclosure discusses loops that are drawn from a "database" without other qualification, it should be understood to be either the AI Database or a separate compilation of loops and parameters stored in database format.

The method for identifying replacement loops might be structured in many different ways but one preferred approach would be as follows. First, the genre of the original song will be identified and, absent user instructions to the contrary, that genre will be used as an initial filter to restrict the possible candidate replacement loops to only that genre. Of course, if the user has indicated that the remix should result in a song in a different genre than that of the original song, the specified genre will be used as a filter instead. Additionally, the candidate replacement loops might be further limited to loops containing the same instrument(s) as are in the selected stem loops. In some cases, after filtering as noted above the fundamental parameters of an original loop that is scheduled to be replaced might be used to position that loop in, for example, 8D space and loops that are neighbors in that space will be identified as possible replacement candidates. Obviously, this last step, i.e., neighbors in 8D space, might be used by itself to select replacement loops without prefiltering, although experience has shown that the results will likely be better if some initial filtering is done first.

Option 240 replaces some or all of the identified loops in the song with loops in the database. In this case, preferably the nearest neighbors in 8D space will be utilized to select replacement loops. If a full remix is requested, the instant invention will replace all of the loops in all of the stems with loops from the database. This will result in no loops from the original song remaining. Because the results of this approach can vary widely in desirability, the user may request multiple full remixes until an acceptable one is obtained. Additionally, if some of the replacement loops are satisfactory and others are not, the satisfactory loops might be frozen in place and the remainder rechosen. Those of ordinary skill in the art will recognize that many variations of this approach are possible.

Another approach to loop replacement which could be used in connection with either option 235 or 240 might utilize a rule-based methodology powered by an expert system. In that case, the user might be offered a loop replacement process that is either focused on preservation or transformation.

Broadly speaking, the preservation option is an approach of focused remixing while keeping the original structure, harmony, etc., of the user's song, whereas the transformation option completely changes the characteristics of the original song and potentially changes every loop in every stem. Additional choices within the two global options might include to allow the user to select a genre preference. The user might indicate a preference for, or bias against, one or more genres. The user might also be allowed to specify an instrument preference for one or more stems, again as either a preference or a bias. Finally, the user could be given the option of specifying a range of tempos of the work as before this range being couched as a preference or bias. Of course, changing the tempo should only be applied to the entire song or sections thereof, rather than to individual loops or stems.

The user's selections above are used to form the rules that are to be applied to the song in connection with this approach. For example, if the user selects the "transformation" option, a genre preference of "pop", and a tempo "fast", the algorithm will use prior expert knowledge of the tempo range of a fast pop song and then proceed to change the structure of the user's song accordingly. This might be done by looking at each stem to determine its tempo and adjusting it accordingly. Each loop in each stem will potentially be exchanged with audio loops that are associated with a pop genre and that have been adjusted to the proper key and tempo before performing the exchange. After this analysis has been performed on each stem and loop, the result will be provided to the user Finally, option 245 represents different approach where the user specifies the stem(s) and/or loop(s) that are to be kept unchanged with all other loops being potentially subject to replacement. After instructions are received from the user as to which stems and loops are not flagged as unavailable, the method then proceeds as described above.

Note that, for purposes of the instant disclosure, remixing at least comprises exchanging the individual sections and pieces of the original song with other sections and pieces of audio or changing properties of the generated sections and pieces or both. All of the options discussed above lead to the generation of a new song that is related in some fashion to the original song. The instant invention will preferably store the new song in the AI Song Pack format 250 so that it can be further remixed as desired by the user.

Figure 4:
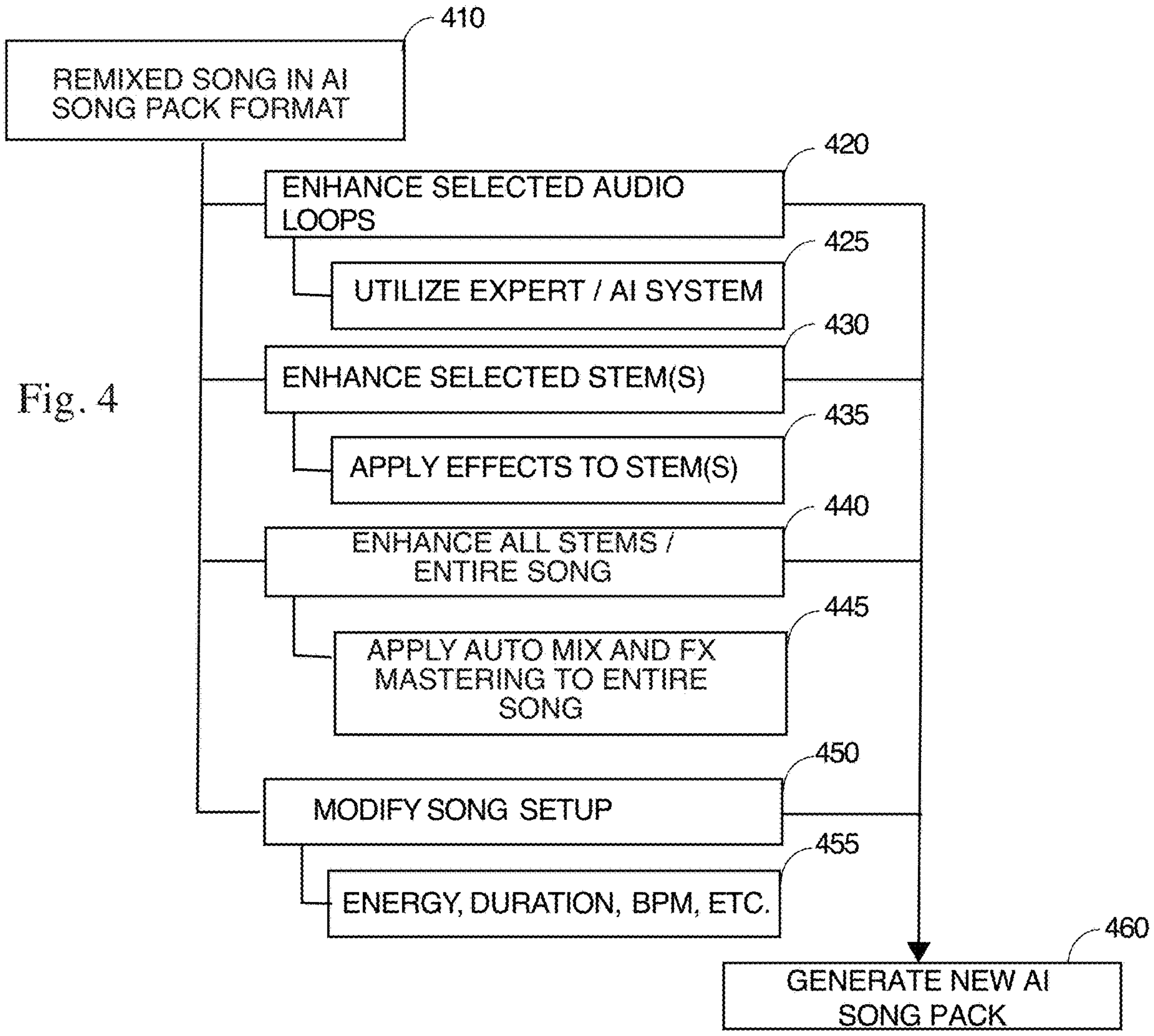
FIG. 4 illustrates an overview over the individual forms of variant and remix generation of the instant invention.

Coming next to FIG. 4, this figure contains details about some further steps that can optionally be applied to the output from FIG. 2. The input will be the remixed song stored in AI Song Pack format 410 from step 250 of FIG. 2. As before, the user will have the option of enhancing individual loops (box 420), individual stems (box 430) or the entire song (box 440).

According to a first approach 420 the user is given the option of selecting individual loops in the input song and the enhancement that is to be applied to them. The term "enhance" as used herein means that the user is able to choose a set of musical parameters that are to be modified for the selected loops. For example, in one approach the user might specify that the selected loop(s) would be "jazzified", e.g., the loops might be modified to add $7^{th}$ chords, extended chords (e.g., $9^{th}$ and $13^{th}$ chords), alter the chords, add passing chords, choose jazz voicings, etc. In some cases templates will be available to the user that define and implement these sorts of changes. Obviously, those of ordinary skill in the art will understand how different templates might be provided for use other styles of music with the templates being constructed by experts and incorporated into an expert system 425.

With respect to the second enhancement approach 430, the user will be allowed to apply effects ("FX") to the previously identified and extracted audio stems 435. The user may request that effects such as reverb, delay, distortion, phasers, chorus, flangers and compression be applied to each audio stem. In some variations, the instant invention will apply a combination of effects to the different stems of the song. For example, the drum stem might be compressed and reverb added to the guitar stem. If a new version of the input song is generated (e.g., if loops have been replaced or effects applied), a new or updated AI Song Pack will be generated.

In the third enhancement approach 440 of FIG. 4, the user can choose to enhance the full master track 445. That is, the user will be able to apply changes to entire audio tracks 440 of the input song. If that option is selected the instant invention will apply an automix algorithm and FX mastering to the complete song. With automix the instant invention will automatically adapt the volume levels across the instrument channels. For example, the instant invention provides a number of unique auto-mixes for specific genres, like House, Techno, Synthwave etc. FX mastering is initiated and executed after the auto-mix algorithms have been applied. In the context of the instant invention, FX mastering stands for the application of a final mastering chain preferably designed to optimize the sound quality. Such a mastering chain is usually a combination of different effects applied to the song. The instant invention provides a number of selectable mastering chain FX presets that allow the user to shape the character of the final product. Such an application of a mastering chain has the potential to further enhance the sonic properties of the song.

Additionally, this aspect of the invention also initiates a potential modification of the song setup 450. This means that the instant invention will modify some or all of the input song's metadata song parameters 355. For example, the songs duration, energy level, beats-per-minute ("bpm"), chord progression, key, etc., might be modified to suit the user.

It should be clear that an approach such as this would be a tremendous aid to the user and would additionally mean an assistance in the development and the creation of professional music pieces/songs and additionally the generation of variants and versions of these music pieces and songs. Therefore, this approach delivers functionality and opportunities to the user of music creation programs which enables a user to begin, continue and complete the music generation process and additionally revisit the generated music for quick remixing. Additionally, since the identification, extraction, creation, provision and selection of available and potentially usable audio samples or loops is based on an original song, the user is instantly and quickly provided with a result list containing generated audio samples or audio loops sequenced into a song composition that relates directly to the original song. Therefore, the instant music generation process of creating music variants based on the content of an original song could benefit extraordinarily from such an approach that allows the user to utilize audio loops or audio samples generated from an original song audio and additionally utilizing the contextualized audio loops or samples in connection with an AI-generated and managed database.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an addition" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least l" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially', "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

CONCLUSIONS

Of course, many modifications and extensions could be made to the instant invention by those of ordinary skill in the art. In one embodiment the process is integrated as a client/server variant, wherein the server provides the original songs and the AI Song Packs and additionally provides the user a remix frontend wherein the user utilizing the remixer generates remixes of original songs for performance or further publication on any social media platform.

What is claimed is:

1. A method of AI-based remixing of a user song, wherein is provided a trained AI program trained on an AI database to intake a song and identify one or more stems within the song and one or more loops within each of the identified stems, said AI database comprising a curated plurality of AI songs, AI stems associated with each of said AI songs, and AI loops associated with each of said AI stems, comprising the steps of:

(a) accessing said user song;

(b) using said trained AI program and said user song to identify at least one stem within said user song;

(c) using said trained AI program to identify at least one stem loop within each of said at least one stems;

(d) calculating a plurality of fundamental parameter values for each of said at least one stem loops within each of said at least one stem of said user song;

(e) using said user song, said at least one stem, each of said at least one stem loops associated with each of said stems, and said plurality of fundamental parameter values for each of said at least one stem loops to form an AI Song Pack;

(f) accessing a loop database containing a plurality of database loops, each of said plurality of database loops having a plurality of database loop fundamental parameter values associated therewith;

(g) receiving a selection from the user of a stem and (1) using said AI Song Pack and said loop database to replace one or more loops of said selected stem with one or more database loops, thereby generating said remixed user song, or (2) receiving a selection of at least one loop associated with said selected stem and using said AI Song Pack and said loop database to replace said chosen loop in said chosen stem with a database loop, thereby generating said remixed user song, or (3) receiving a selection of at least one loop associated with said selected stem and using said AI Song Pack and said loop database to replace any other loop in said chosen stem except for said chosen loop with a database loop, thereby generating said remixed user song, and (h) performing at least a portion of said remixed user song for the user.

2. The method of AI-based song remixing according to claim 1, wherein step (d) comprises the step of:

(d1) calculating a plurality of fundamental parameter values for each of said at least one stem loops within each of said at least one stem, (d2) using said plurality of fundamental parameter values to calculate a reduced dimensionality parameter set for each of said at least one stem loops, and wherein step (f) comprises the step of (f1) using said user song, said at least one stem, each of said at least one stem loops associated with each of said stems, and said reduced dimensionality parameter set for each of said at least one stem loops to form an AI Song Pack.

3. The method of AI-based song remixing according to claim 1, wherein step (g)(1) comprises the step of:

(g1) using said AI Song Pack and said loop database to replace each of said loops of said selected stem with a database loop, thereby generating said remixed user song.

4. The method of AI-based song remixing according to claim 1, wherein said AI database and said loop database are a same database.

5. A method of AI-based remixing of a user song, wherein is provided a trained AI program trained on an AI database to intake a song and identify one or more stems within the song and one or more loops within each of the identified stems, said AI database comprising a curated plurality of AI songs, AI stems associated with each of said AI songs, and AI loops associated with each of said AI stems, comprising the steps of:

(a) accessing said user song;

(b) using said trained AI program and said user song to identify at least one stem within said user song;

(c) using said trained AI program to identify at least one stem loop within each of said at least one stems;

(d) calculating a plurality of low level fundamental parameter values for each of said at least one stem loops within each of said at least one stem of said user song;

(e) using said plurality of low level fundamental parameter values to calculate a plurality of reduced dimensionality parameter values for each of said at least one stem loops;

(f) obtaining a plurality of metadata values for each of said at least one stem loops of said user song, said plurality metadata values and said plurality of low level fundamental parameter values for each of said at least one stem loops together comprising a plurality of fundamental parameter values for each of said at least one stem loops;

(g) using said user song, said at least one stem, each of said at least one stem loops associated with each of said stems, and fundamental parameter values for each of said at least one stem loops to form an AI Song Pack;

(h) accessing a loop database containing a plurality of database loops, each of said plurality of database loops having a plurality of database metadata values and a plurality of database reduced dimensionality parameter values associated therewith;

(i) receiving a selection from the user of a stem and (1) using said AI Song Pack and said loop database to replace one or more loops of said selected stem with one or more database loops, thereby generating said remixed user song, or (2) receiving a selection of at least one loop associated with said selected stem and using said AI Song Pack and said loop database to replace said chosen loop in said chosen stem with a selected database loop, thereby generating said remixed user song, or (3) receiving a selection of at least one loop associated with said selected stem and using said AI Song Pack and using said loop database to replace any other loop in said chosen stem except for said chosen loop with a database loop, thereby generating said remixed user song, and (j) performing at least a portion of said remixed user song for the user.

6. The method of AI-based song remixing according to claim 5, wherein said plurality of reduced dimensionality parameter values comprises between 5 and 15 parameter values.

7. The method of AI-based song remixing according to claim 5, wherein said plurality of reduced dimensionality parameter values comprises eight parameter values and wherein each of said database loops and each of said at least one stem loops having a location in 8D space associated therewith.

8. The method of AI-based song remixing according to claim 7, wherein claim step (i)(1) comprises the step of:

(i1) using said AI Song Pack and said loop database to replace one or more loops of said selected stem with one or more database loops by choosing said one or more database loops based on their locations in 8D space relative to said positions in 8D space of selected one or more loops of said selected stem, thereby generating said remixed user song.

9. The method of AI-based song remixing according to claim 7, wherein claim step (i)(2) comprises the step of:

(i2) receiving a selection of at least one loop associated with said selected stem and using said AI Song Pack and said loop database to replace said chosen loop in said chosen stem with a selected database loop by choosing said selected database loop based on its location in 8D space relative to said chosen loop in said chosen stem, thereby generating said remixed user song.

10. The method of AI-based song remixing according to claim 7, wherein claim step (i)(3) comprises the step of:

(i3) receiving a selection of at least one loop associated with said selected stem and using said AI Song Pack and using said loop database to replace any other loop in said chosen stem except for said chosen loop with a replacement database loop, said replacement database loop being selected based on its location in 8D space relative to said any other loop in said chosen stem, thereby generating said remixed user song.

11. The method of AI-based song remixing according to claim 5, wherein claim step (i)(1) comprises the step of:

(i1) using said AI Song Pack and said loop database to replace each of said loops of said selected stem with a database loop, thereby generating said remixed user song.

12. The method of AI-based song remixing according to claim 5, wherein said AI database and said loop database are a same database.

13. The method of AI-based song remixing according to claim 5, wherein said remixed song has a same number of stems as said identified stems in said user song, and step (j) comprises the steps of:

(1) obtaining a selection from the user of one of more of said remixed user song stems, (2) obtaining a selection from the user of at least one type of effect to apply to said selected one or more remixed user song stems, (3) applying said selected at least one type of effect to each of said selected one or more remixed user song stems, and (4) performing at least a portion of said remixed user song for the user.

14. The method of AI-based song remixing according to claim 13, wherein said at least one type of effect includes one or more of a reverb, a delay, a distortion, a phaser, a chorus, a flanger, and a compression.

15. The method of AI-based song remixing according to claim 5, wherein step (j) comprises the steps of:

(1) applying an automix algorithm to said remixed song, and (2) performing at least a portion of said automixed remixed user song for the user.

16. The method of AI-based song remixing according to claim 5, wherein said remixed user song has a plurality of remixed song setup parameter values associated therewith, wherein said remixed song setup parameters include a remixed song duration, a remixed song energy level, a remixed song number of beats-per-minute, a remixed chord progression, and a remixed key, and wherein step (j) comprises the steps of:

(1) obtaining a selection from the user of a remixed song setup parameter and a selected remixed song setup parameter value associated therewith, (2) selecting a new remixed song parameter value different from said selected remixed song setup parameter value, (3) using said new remixed song setup parameter value to modify said remixed song, and (4) performing at least a portion of said remixed user song for the user.

* * * * *